(12) United States Patent
Lavillonniere et al.

(10) Patent No.: US 7,787,722 B2
(45) Date of Patent: Aug. 31, 2010

(54) METHOD FOR COORDINATING AN UPLINK TDMA ACCESS SHARED BY SEVERAL SUB-NETWORKS OF A PASSIVE OPTICAL NETWORK (PON)

(75) Inventors: Eric Lavillonniere, Noyal sur Vilaine (FR); Olivier Weppe, Acigne (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/547,160

(22) Filed: Aug. 25, 2009

(65) Prior Publication Data

US 2010/0054739 A1     Mar. 4, 2010

(30) Foreign Application Priority Data

Sep. 2, 2008 (EP) .................................. 08305516

(51) Int. Cl.
*G02B 6/28* (2006.01)
(52) U.S. Cl. .......................................... 385/24; 385/15
(58) Field of Classification Search ................... 385/15, 385/24
See application file for complete search history.

(56) References Cited

U.S. PATENT DOCUMENTS 6,778,550 B1 * 8/2004 Blahut ..................... 370/443

7,408,955 B2 * 8/2008 Choi et al. ................... 370/468

FOREIGN PATENT DOCUMENTS

| EP | 1 478 135 A1 | 11/2004 |
|---|---|---|
| EP | 1 858 185 A2 | 11/2007 |
| JP | 2007-274534 | 10/2007 |
| WO | WO 2005/096166 A1 | 10/2005 |

* cited by examiner

*Primary Examiner*—Jennifer Doan
(74) *Attorney, Agent, or Firm*—Oblon, Spivak, McClelland, Maier & Neustadt, L.L.P.

(57) ABSTRACT

A Passive Optical Network (PON) comprises at least a first sub-network (16) with a first Optical Line Terminal (4) and a first set of Optical Network Units (8, 12), a second sub-network (18) with a second Optical Line Terminal (6) and a second set of Optical Network Units (8) interconnected to a same splitter (14). In downlink direction from Optical Line Terminals to Optical Network Units, each sub-network uses a different wavelength ($\lambda 1$, $\lambda 2$) and in uplink direction all ONUs (8, 10, 12) are able to access all Optical Line Terminals through an uplink TDMA access by using one single wavelength ($\lambda 3$).

The dynamic transmission resources allocation units of all Optical Line Terminals have the same process and coordination of the uplink TDMA access is carried out by sending (112) from a determined master Optical Network Unit to the other Optical Line Terminals different from its associated Optical Line Terminal an echoed synchronization message containing synchronization information related to its corresponding Optical Line Terminal referred as master Optical Line Terminal.

10 Claims, 4 Drawing Sheets

METHOD FOR COORDINATING AN UPLINK TDMA ACCESS SHARED BY SEVERAL SUB-NETWORKS OF A PASSIVE OPTICAL NETWORK (PON)

The present invention relates to a method for coordinating a common uplink TDMA access shared by several networks of a Passive Optical Network (PON) and a system for implementing such a method.

Passive Optical Networks (PON) are well known as being one among the two architectures of the access part of optical networks.

According to the Passive Optical Network (PON) architecture, also called Point to Multipoint architecture, a conventional Passive Optical Network (PON) comprises an Optical Line Terminal (OLT) connected to a switch belonging to a high rate optical networking infrastructure and a set of optical splitters wherein each optical splitter is upwardly connected to the Optical Line Terminal (OLT) through a different respective dedicated fibre.

The Passive Optical Network also comprises several user terminals, also called Optical Network Units (ONUs) grouped within clusters.

The optical network units of each cluster share one same fibre from the Optical Line Terminal to the splitter respectively associated to the corresponding cluster.

The optical network units (ONUs) of each cluster are connected to the corresponding optical splitter through different respective dedicated fibres.

In the Passive Optical Network architecture, since only one fibre is shared by the Optical Network Units of one cluster both for uplink (from the splitter of the cluster to Optical Line Terminal) and downlink (from Optical Line Terminal to the splitter associated to the Optical Network Units of the cluster), uplink and downlink data are transmitted simultaneously using two distinct wavelengths of the laser. Such a downlink/uplink access scheme is referred as wavelength duplex access.

In the uplink direction, a time slot is allocated repeatedly to each user of a cluster, wherein transmission of data is enabled.

Time slots are configured into a frame in such a way to avoid simultaneous transmission which could collide. Such an uplink access scheme from the Optical Network Units to the Optical Line Terminal is called a Time Division Multiplexing Access (TDMA).

With the possibility of using several light wavelength in the same fibre a new type of layout has been recently proposed wherein a set of Optical Network Units share at least two optical line Terminals through a same splitter in the uplink direction.

In such a layout, the optical network units (ONUs) connected to the same splitter are arranged to share several sub-networks, wherein a sub-network comprises one distinct Optical Line Terminal with corresponding Optical Network Units (ONUs) connected to.

Each sub-network uses in downlink a distinct wavelength so that any transmitted packet from any Optical Line Terminal would not cause any packet collision with a packet sent from another Optical Line Terminal for the Optical Network Unit associated to.

All the sub-networks use a common uplink through the same splitter by using a same wavelength and are required to share this common uplink access trough a coordinated TDMA access.

Each sub-network is able to acquire the knowledge of the transmission resources and ranging information related to its corresponding Optical Network Units in order to allocate slots and synchronize the TDMA access in uplink for its corresponding Optical Network Units.

However, since no direct links are available between the Optical Line Terminals, there is no way for each Optical Line Terminal corresponding to a respective different sub-network to know the transmission resources and ranging information related to the Optical Network Units (ONUS) corresponding to the other sub-networks.

Therefore, the different Optical Line Terminals cannot be synchronized between each other and the uplink TDMA access cannot be coordinated for all the Optical Network Units connected to the same splitter and arranged according several sub-networks.

The technical problem is to determine a way to coordinate the uplink TDMA access used by all the Optical Network Units arranged according to several sub-networks with the new topology of Passive Optical Network.

The invention accordingly relates to an uplink TDMA access shared by at least two sub-networks of a Passive Optical Network, the first sub-network comprising a first Optical Line Terminal and a first set of Optical Network Units connected to the first Optical Line Terminal through a same splitter, a second sub-network comprising a second Optical Line Terminal and a second set of Optical Network Units connected to the second Optical Line Terminal through the same splitter as used by the first sub-network, each Optical Network Unit belonging to the first sub-network sharing a same first wavelength in a downlink and each Optical Network Unit belonging to the second sub-network sharing a same second wavelength in downlink, the first and second wavelengths being different, each Optical Network Unit belonging to both the first and second sub-networks sharing a same uplink wavelength different from the first and second wavelengths used in downlink direction, the first Optical Line Terminal being able to allocate transmission resources for the TDMA uplink access to be used by the corresponding Optical Network Units of the first set and able to prescribe time of transmissions in the TDMA uplink for the slots to be used by its corresponding Optical Network Units according to the allocated transmission resources and round trip propagation delays between the first Optical Line Terminal and the corresponding Optical Network Units of the first set, the second Optical Line Terminal being able to allocate transmission resources for the TDMA uplink access to be used by the corresponding Optical Network Units of the second set and able to prescribe time of transmissions in the TDMA uplink for the slots to be used by its corresponding Optical Network Units according to the allocated transmission resources and round trip propagation delays between the second Optical Line Terminal and the corresponding Optical Network Units of the second set, comprising the steps consisting of:

listening by each Optical Line Terminal all the uplink signalling data sent by all the Optical Network Units of all the sub-networks, characterized in that it comprises the following steps consisting of:

determining throughout all the sub-networks a master Optical Network Unit among all the Optical Network Units as the first listened and declared Optical Network Unit by the corresponding master Optical Line Terminal referenced as master Optical Line Terminal, at a local time t0*bis* relative to the master Optical Line Terminal, sending from the master Optical Network Unit to the other Optical Line Terminals referenced as slave Optical Line Terminals an echoed synchronization message containing synchronization information related to the corresponding master Optical Line Terminal, and in that allocation process of uplink TDMA transmission resources by each Optical Line Terminal to the respective corresponding Optical Network Units is executed in the same way on the basis of the same sequenced uplink signalling data sent by all the Optical Network Units of all the sub-networks, prescription process by each Optical Line Terminal of the time of transmissions in the TDMA uplink for the slots to be used by its corresponding Optical Network Units according to the allocated transmission resources and round trip propagation delays between the Optical Line Terminal and its corresponding Optical Network Units is a same process.

According to particular embodiments, the method for coordinating a TDMA access comprises one or more of the following characteristics:

after the step of sending from the master Optical Network Unit to the other Optical Line Terminals an echoed packet containing synchronization information related to the corresponding master Optical Line Terminal, it comprises the following steps consisting of, for each slave Optical Line Terminal:

intercepting at a respective interception local time t3 provided by the clock of the slave Optical Line Terminal the echoed synchronization message containing the synchronization information related to the corresponding master, and translating the current respective interception local time t3 by the time difference between a synchronization time derived from the synchronization information and the current local time t3 to obtain a new local time respective to slave Optical Line Terminal, so that every message intercepted in uplink in a given time of the new translated local time is also seen at the same time by the clock of the master Optical Line Terminal;

it comprises a step consisting of ranging the master Optical Network Unit relative to the master Optical Line Terminal by computing at the master Optical Line Terminal level a propagation round trip time between the master Optical Line Terminal and the master Optical Network Unit, the ranging of the master Optical Network Unit being executed before the step of sending the synchronization information, and synchronization information related to the corresponding master Optical Line Terminal contains the local time information t0*bis* relative to the master Optical Line Terminal of sending a ranging packet and the computed ranging data;

the synchronization time is the sum of the local time information t0*bis* relative to the master Optical Line Terminal of sending a ranging packet and the computed ranging data;

the step of ranging the master Optical Network Unit relative to the master optical line Terminal comprises the steps consisting of sending from the master Optical Line Terminal an echo ranging message at t0, local time relative the master OLT, containing the local time information t0, upon receiving by the master Optical Network Unit the ranging message containing t0, synchronizing the clock of master Optical Network Unit at a synchronized time by setting the said clock at t0, sending from the master Optical Network Unit a ranging message at t1, referenced to the synchronized time of the master Optical Network Unit clock, and containing the synchronized local time information t1, upon receiving by the master Optical Line Terminal at local time t2 relative to master Optical Line Terminal the ranging message containing the time information t1, computing the propagation round trip time between the master Optical Line Terminal and the master Optical Network Unit as the difference between t2 and t1;

in the step during the step of sending an echoed message from the master Optical Network Unit, the echoed synchronization message further contains information related to the Optical Network Units associated to and ranged by the master Optical Line Terminal, and in that it comprises the following step consisting of:

duplicating by the slave Optical Line Terminals the current transmission resource values from Optical Network Units associated to master OLT;

it comprises the step consisting of after translating the clocks of all the slave Optical Line Terminals, for each slave Optical Line Terminal, discovering the respective associated slave Optical Network Units relative to the corresponding slave Optical Line Terminal with all the transmission parameters relative to each slave Optical Network Unit;

the discovery step of the slave Optical Network Units associated to the corresponding slave Optical Line Terminal comprises the following steps consisting of:

sending by the slave Optical Line Terminal a discovery request message at the same time as the master Optical Line Terminal to all associated slave Optical Network Units, containing an identifier of the slave Optical Line Terminal, ranging each slave Optical Network Unit relative to the slave Optical Line Terminal by subsequently:

sending from the slave Optical Line Terminal a ranging message at ts0, local time relative the master OLT, containing the local time information ts0, upon receiving by the slave Optical Network Unit the ranging message containing ts0, synchronizing the clock of slave Optical Network Unit at a synchronized time by setting the said clock at ts0, sending from the slave Optical Network Unit a ranging message at ts1, referenced to the synchronized time of the slave Optical Network Unit clock, and containing the synchronized local time information ts1 as well as the identifier of the slave Optical Line Terminal, and upon receiving by the corresponding slave Optical Line Terminal at local time ts2 relative to master Optical Line Terminal the ranging message containing the time information ts1, computing the propagation round trip time between the slave Optical Line Terminal and the slave Optical Network Unit as the difference between ts2 and ts1.

The invention also relates to a Passive Optical Network wherein is implemented a method of coordination of an uplink TDMA access Passive optical network (PON) comprising at least two sub-networks, a first sub-network comprising a first Optical Line Terminal and a first set of Optical Network Units (8, 12) connected to the first Optical Line Terminal through a same splitter, a second sub-network comprising a second Optical Line Terminal and a second set of Optical Network Units connected to the second Optical Line Terminal through the same splitter as used by the first sub-network, each Optical Network Unit belonging to the first sub-network sharing a same first wavelength in a downlink and each Optical Network Unit belonging to the second sub-network sharing a same second wavelength in downlink, the first and second wavelengths being different, each Optical Network Unit belonging to both the first and second sub-networks sharing a same uplink wavelength different from the first and second wavelengths and used in the downlink, the first Optical Line Terminal having a first dynamic transmission resources allocation unit being able to allocate transmission resources for the TDMA uplink access to be used by the corresponding Optical Network Units of the first set and a multiple point control unit able to prescribe time of transmissions in the TDMA uplink for the slots to be used by its corresponding Optical Network Units according to the allocated transmission resources and computed round trip propagation delays between the first Optical Line Terminal and the corresponding Optical Network Units of the first set, the second Optical Line Terminal having a second dynamic transmission resources allocation unit being able to allocate transmission resources for the TDMA uplink access to be used by the corresponding Optical Network Units of the second set and a multiple point control unit able to prescribe time of transmissions in the TDMA uplink for the slots to be used by its corresponding Optical Network Units according to the allocated transmission resources and computed round trip propagation delays between the second Optical Line Terminal and the corresponding Optical Network Units of the second set, characterized in that each Optical Line Terminal comprises Optical Line Terminal means for coordinating an uplink TDMA access firstly as a master Optical Line Terminal able to determine throughout all the sub-networks a master Optical Network Unit among all the Optical Network Units as the first listened and declared ONU by the corresponding master Optical Line Terminal referenced as master Optical Line Terminal, each Optical Network Unit comprises Optical Network Unit means for coordinating uplink TDMA access, firstly as a master Optical Network Unit able at a local time t0bis relative to the master Optical Line Terminal, sending to the other Optical Line Terminals referenced as slave Optical Line Terminals an echoed synchronization message containing synchronization information related to the corresponding master Optical Line Terminal, all the dynamic transmission resources allocation units are able to carry out a same allocation process, all the multiple point control units are able to carry out the same prescription process of the time of transmissions.

According to particular embodiments, the system comprises one or more of the following characteristics:

each Optical Line Terminal means for coordinating an uplink TDMA access, secondly, operating as for a slave Optical Line Terminal, are able after receiving from the master Optical Network Unit an echoed packet containing synchronization information related to the corresponding master Optical Line Terminal, to intercept at a respective interception local time ts3 provided by the clock of the slave Optical Line Terminal, the echoed synchronization message containing the synchronization information related to the corresponding master Optical Line Terminal, and to translate the current respective interception local time ts3 by the time difference between a synchronization time derived from the synchronization information and the current local time t3 to obtain a new local time respective to slave Optical Line Terminal, so that every message intercepted in uplink in a given time of the new translated local time is also seen at the same time by the clock of the master Optical Line Terminal.

A better understanding of the invention will be facilitated by reading the following description, which is given solely by way of examples and with reference to drawings, in which.

Figure 1:
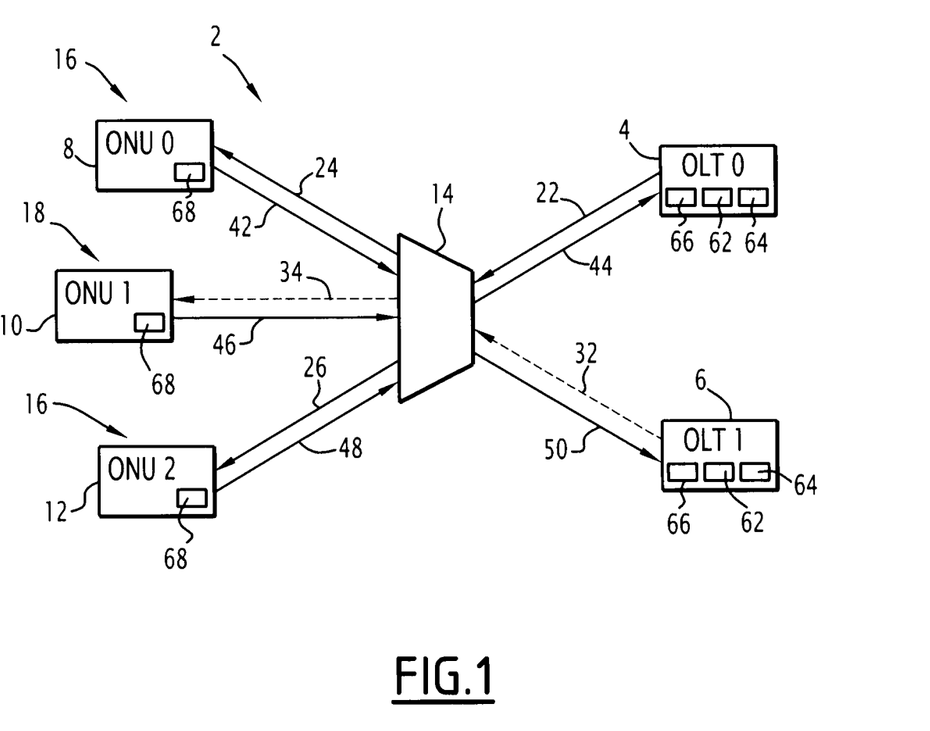
FIG. 1 is an architectural partial view of a Passive Optical Network wherein is implemented the method for coordinating an uplink according to the invention.
Figure 2:
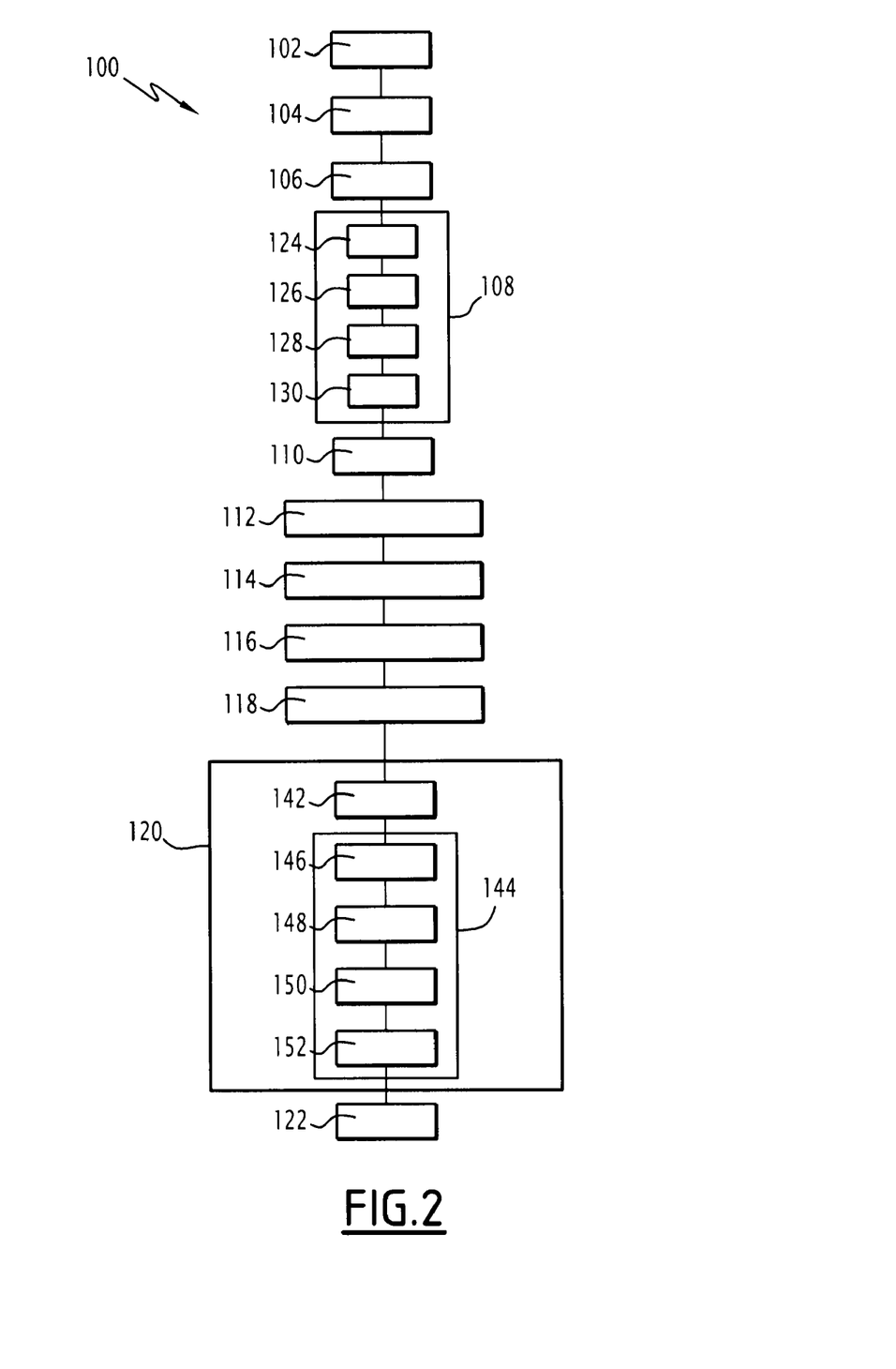
FIG. 2 is a flow chart of a method according to the invention for coordinating an uplink TDMA access implemented in the architecture of the FIG. 1.
Figure 5:
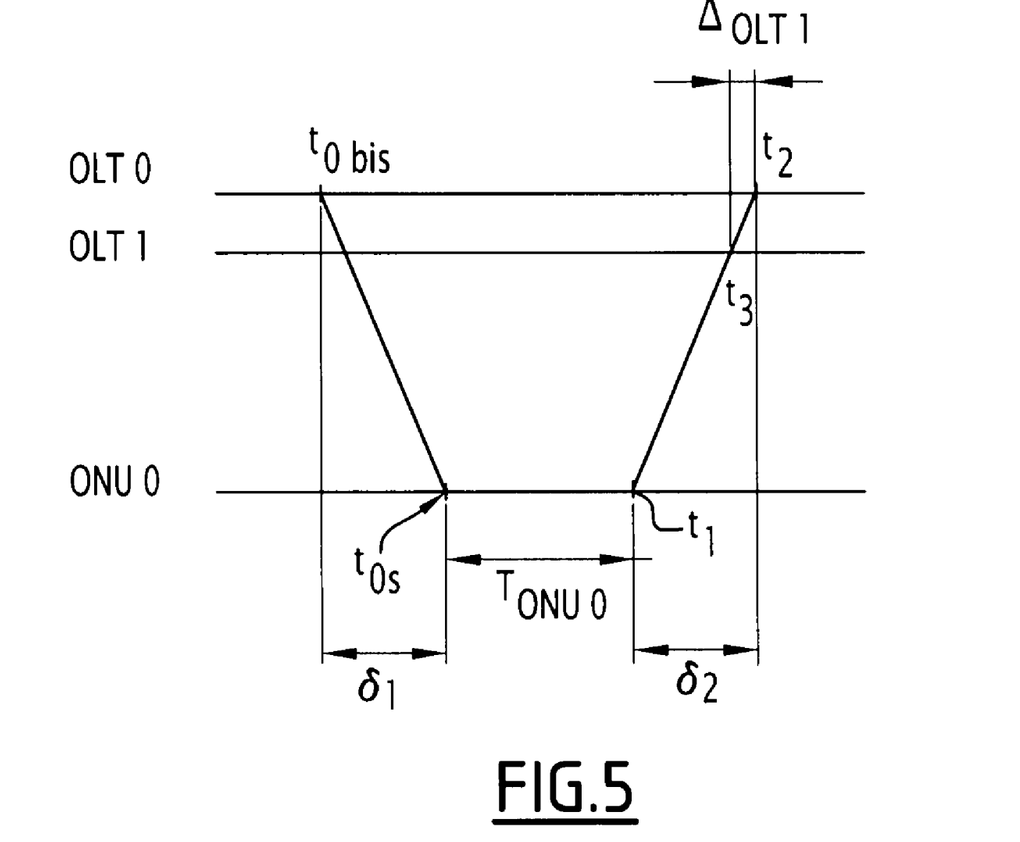

FIG. 5 is a view of a time-space chart representing signalling exchange between the master Optical Line Terminal, the master Optical Network Unit and a slave Optical Network Unit for synchronizing the slave Optical Line Terminal to the master Optical Line Terminal according to the method of FIG. 2, According to FIG. 1, a Passive Optical Network also referred as PON comprises a set 2 of several Optical Line Terminal 4, 6 and several Optical Network Units 8, 10, 12 connected to the Optical Line Terminals through a same splitter 14.

The number of Optical Line Terminals 4, 6 and Optical Network Units connected 8, 10, 12 connected together is for sake of simplicity respectively equal to two and three.

The set 2 is arranged according several sub-networks, here two sub-network 16 and 18, a generic sub-network comprising only one single Optical Line Terminal and a number of Optical Network Units.

The two Optical Line Terminals of any combination of two sub-networks are different.

In the example of FIG. 1, the first sub-network 16 comprises a first Optical Line Terminal 4 referred as OLT0 connected to the shared splitter 14 by an optical fibre not shown and a first set of the two Optical Network Units 8 and 12, also denoted respectively ONU0 and ONU2, connected to the shared splitter 14 through a respective different optical fibre not shown.

The second sub-network 18 comprises a second Optical Line Terminal 6 referred as OLT1 connected to the shared splitter 14 by an optical fibre not shown and a second set of a single Optical Network Unit 10 also denoted ONU1 connected to the shared splitter 14 through a respective optical fibre not shown.

For each sub-network, the Optical Network Units belonging to the same sub-network share a same distinct fibre connecting the Optical Line Terminal respectively associated to the same sub-network to the splitter 14.

The Optical Network Units of each sub-network 16, 18 are connected to the same optical splitter 14 through different respective dedicated fibres.

Each Optical Network Unit 8, 12 belonging to the first sub-network 16 shares a same first wavelength $\lambda 1$ in a first downlink shown in full lines comprising elementary downlinks 22, 24 in series respective to ONU0 (from OLT0 to splitter 14 and from splitter 14 to ONU0), and two downlinks 22, 26 in series respective to ONU2 (from OLT0 to splitter 14 and from splitter 14 to ONU2).

The Optical Network Unit 10 belonging to the second sub-network 18 shares alone a same second wavelength $\lambda 2$ in a second downlink shown in dotted lines comprising here two elementary downlinks 32, 34 in series respective to ONU1 (from OLT1 to splitter 14 and from splitter 14 to ONU1).

The first and second wavelengths, λ1 and λ2, used in a same fibre are different.

Each Optical Network Unit 8, 10, 12 belonging to both the first 16 and second sub-networks 18 share a same uplink wavelength λ3 in a uplink comprising two uplinks 42, 44 in series from ONU0 to OLT0 through the splitter 14, two uplinks 46, 44 in series from ONU1 to OLT0 through the splitter 14, two uplinks 48, 44 in series from ONU2 to OLT0 through the splitter 14, two uplinks 42, 50 in series from ONU0 to OLT1 through the splitter 14, two uplinks 46, 50 in series from ONU1 to OLT1 through the splitter 14, two uplinks 48, 50 in series from ONU2 to OLT1 through the splitter 14.

The uplink wavelength λ3 is different from the first and second wavelengths, λ1 and λ2 used in the downlink.

In the Passive Optical Network architecture of FIG. 1, since only one fibre is shared by the Optical Network Units of a same sub-network both for OLT uplink (from the splitter 14 to corresponding Optical Line Terminal) and Optical Line Terminal downlink (from corresponding Optical Line Terminal to the splitter 14), uplink and downlink data are transmitted without collisions even simultaneously by using the two distinct wavelengths of the laser, λ1 and λ3 for the first sub-network 16, λ2 and λ3 for the first sub-network 18.

Such a downlink/uplink access scheme is referred as wavelength duplex access.

Since the wavelength λ3 is the same for uplink, all the Optical Line Terminals from all sub-networks 16, 18 are able to listen to all the transmitted packets from all Optical Network Units.

A given Optical Line Terminal, for instance OLT0 is therefore able to listen to all the Optical Network Units 8, 12 belonging to its own sub-network 16 but also to listen to the remaining Optical Network Units, here Optical Network Unit 10 belonging to the other sub-networks, here the second sub-network 18.

In the uplink direction, a time slot is allocated repeatedly to each Optical Network Unit.

Time slots are configured into a frame in such a way to avoid simultaneous transmission which could collide. Such an uplink access scheme from the user terminals to the OLT is called a Time Division Multiplexing Access (TDMA).

Possibility of using several light wavelength λ1 and λ2 in a same fibre for downlink enable two different Optical Line Terminals, here OLT0 and OLT1 connected to the same splitter 14 to transmit at the same time different data to their respective set of Optical Network Units 8, 12 for the first set and 10 for the second without any risk of packet collision.

Such a downlink access scheme is a wavelength multiple access respective to sub-networks 14 and 16.

The first Optical Line Terminal 4 OLT0 and the second optical line Terminal 6 OLT1 comprise respectively a first dynamic transmission resources allocation unit 62 and a second dynamic transmission resources allocation unit 62, each dynamic transmission resources allocation unit 62 also referred to DBA unit (Dynamic Bandwidth Allocation unit) being able to allocate transmission resources for the TDMA uplink access to be used by the corresponding Optical Network Units 8, 12 of the first set, respectively the unit 10 of the second set.

The first Optical Line Terminal 4 OLT0, respectively the second Optical Line Terminal 6 OLT1, also comprise a first multiple point control unit, respectively a second multiple point control unit 64 able to prescribe time of transmissions in the TDMA uplink for the slots to be used by the corresponding Optical Network Units 8, 12 of the first set, respectively the unit 10 of the second set, according to the allocated transmission resources and computed round trip propagation delays between the first OLT0, respectively the second Optical Line Terminal OLT1 and the corresponding Optical Network Units of the first set, respectively of the second set.

The two dynamic transmission resources allocation units 62, 62 are able to carry out a same allocation process according to same DBA algorithms.

The two multiple point control units 64, also referred to MPCP unit (Multiple Point Control Point unit) are able to carry out the same prescription process related to the times of packet transmissions according to same MPCP algorithms.

Each OLT 4, 6 comprises Optical Line Terminal means 66 for coordinating the uplink TDMA access, able firstly as a discovering Optical Line Terminal to determine throughout all the sub-networks 16, 18 a master Optical Network Unit among all the Optical Network Units as the first registered and declared Optical Network Unit by the corresponding Optical Line Terminal referenced then as the master Optical Line Terminal, and able to manage coordinating process as secondly a master Optical Line Terminal and as thirdly a slave Optical Line Terminal.

Each Optical Network Unit 8, 10, 12 comprises Optical Network Unit means 68 for coordinating the uplink TDMA access, as a master Optical Network Unit able at a given local time relative to the master Optical Line Terminal to send to the other Optical line Terminals referenced as slave Optical Line Terminals an echoed synchronization message containing synchronization information related to the corresponding master Optical Line Terminal.

The Optical Line Terminal means 66 of each Optical Line Terminal 4, 6 have the same Optical Line Terminal process for coordinating the uplink TDMA access according to same algorithms.

The Optical Network Unit means 68 of each Optical Network Unit 8, 10, 12 have the same Optical Network Unit process for coordinating the uplink TDMA access according to same algorithms According to FIG. 2, a method 100 for coordinating the uplink TDMA access shared by at least two sub-networks of a Passive Optical Network comprise a set of subsequent steps 102, 104, 106, 108, 110, 112, 114, 116, 118, 120, 122.

In a first step 102, each Optical Line Terminal among OLT0 and OLT1 listens to all the uplink signalling data sent from all the Optical Network Units 8, 10, 12 of all the sub-networks 16 and 18.

In a second step 104, while at least two Optical Line Terminals, OLT0 and OLT1 are connected to the splitter 14 and are powered on and are working, a master Optical Network Unit is determined. It is assumed that ONU0 is the determined master Optical Network Unit.

If already some coordinated upstream traffic is flowing, a determined master Optical Network Unit already exists.

In case no coordinated upstream traffic is detected, OLT0 and OLT1 send discovery messages until one optical network unit answers correctly.

In case collisions occur between responses issued from different Optical Network Units, a conventional retry approach as used in a CSMA/CD (Carrier Sense Multiple Access/Collision Detect) is used until one Optical Network Unit answers correctly.

Once a correct Optical Network Unit belonging to the sub-network of the Optical Line Terminal listening has been detected, for instance ONU0, the detected ONU is declared by OLT0 as the master Optical Network Unit.

In a subsequent step 106, the optical line Terminal OLT0 sends a declaration message to the master ONU0 and the other Optical Network Units belonging to the same sub-network 16 indicating that ONU0 is the master Optical Network Unit and that OLT0 is the master Optical Line Terminal.

In the same step 106, OLT0 requests to ONU0 to acknowledge that it becomes the master Optical Network Unit.

In the same step 106, the master Optical Network Unit ONU0 sends an uplink message to all the Optical Line Terminals declaring that ONU0 is the master Optical Network Unit, and OLT0 is the master Optical Line Terminal. From this step 106 all the newly discovered Optical Network Units will be taken into account into the processing carried out by all the Optical Line Terminals including the master Optical Line Terminal and the slave Optical Line Terminals.

Then in a step 108, ranging the master Optical Network Unit ONU0 relative to the master Optical Line Terminal OLT0 is carried out by computing at the master Optical Line Terminal OLT0 level a propagation round trip time RTT0 between the master Optical Line Terminal OLT0 and the master Optical Network Unit ONU0, in forward direction from OLT0 to ONU0 and in return direction from ONU0 to OLT0.

If it is possible, the ranging of other Optical Network Units belonging to the same sub-network 16 as ONU0 is carried out by OLT0.

In a subsequent step 110, the master Optical Line Terminal OLT0 sends regularly echo synchronization messages to the master Optical Network Unit ONU0.

The echo synchronization message contains synchronization information related to the master Optical Line Terminal OLT0 comprising a local time t0*bis* relative to OLT0 of sending the echo synchronization message and the computed propagation round trip time RTT0 between the master Optical Line Terminal OLT0 and the master Optical Network Unit ONU0.

The echo synchronization message may possibly further contain information related to the Optical Network Units associated to and ranged by the master OLT0.

Then, in a step 112, upon receiving the echo synchronization message issued from OLT0, the master Optical Network Unit ONU0 sends to the other Optical Line Terminals referred as to slave Optical Line Terminals, here OLT1, an echoed synchronization message containing synchronization information related to the master Optical Line Terminal OLT0.

In a subsequent step 114, each slave Optical Line Terminal intercepts, at a respective interception local time t3 provided by the clock of the slave Optical Line Terminal, the echoed synchronization message containing the synchronization information related to the master Optical Line Terminal OLT0. Here for sake of simplicity, OLT1 is the only one slave Optical Line Terminal.

Then, in a step 116, the clock of each slave Optical Line Terminal, here only OLT1 translates the current interception local time t3 by the time difference between a synchronization time derived from the synchronization information and the current local time t3 to obtain a new slave local time relative to OLT1, so that every message intercepted in uplink at a given time of the new translated local time of OLT1 is also seen at the same time by the clock of the master Optical Line Terminal OLT0.

The synchronization time is the sum of the local time information t0*bis* relative to the master OLT0 of sending an echo synchronization message and the computed ranging data RTT0.

In a variant, the synchronization message contains the computed sum of the local time information t0*bis* relative to the master OLT0 of sending the echo synchronization message and the computed ranging data RTT0. In this variant, the synchronization time is read directly by the slave OLT from the synchronization message.

In a subsequent step 118, the slave Optical Line Terminal, here OLT1, may duplicate the transmission resources of the Optical Network Units associated to and ranged by master OLT0 as currently known from OLT0 and ONU0.

Then in a step 120, each slave Optical Line Terminal, here only OLT1, discovers its associated slave Optical Network Units, here ONU1 belonging to the same sub-network 18 with all the transmission parameters relative to each slave Optical Network Units.

Figure 3:
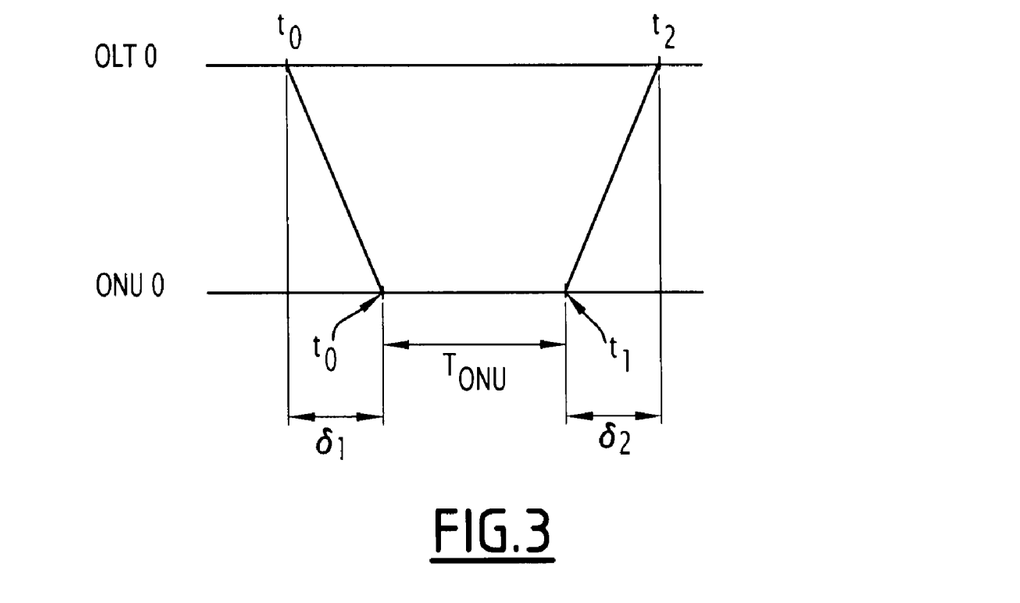
FIG. 3 is a view of a time-space chart representing signalling exchange between a master Optical Line Terminal and a master Optical Network Unit during a ranging step of the method shown in FIG. 2.

The step 108 of ranging the master Optical Network Unit ONU0 relative to the master Optical Line Terminal OLT0 comprises a set of subsequent steps 124, 126, 128, 130. Displacement in time of the ranging messages exchanged by OLT0 and ONU0 is shown in FIG. 3 for a better understanding.

In a step 124, the master Optical Line Terminal OLT0 sends a ranging message at t0 in local time relative to the clock of OLT0. The ranging message sent at t0 contains the local time information t0.

In a step 126, upon receiving by the master Optical Network Unit ONU0 the ranging message containing t0, the clock of the master Optical Network Unit ONU0 is synchronized by setting the clock of ONU0 at t0.

Then, in a step 128, the master Optical Network Unit ONU0 sends a ranging message at the time t1, relative to the synchronized time of the master ONU0 clock, and containing the synchronized local time information t1. The time t1 is the sum of t0 and a processing time unknown denoted $T_{ONU}$.

Then, in a step 130, the master Optical Line Terminal OLT0 receives at local time t2 of the OLT0 clock the ranging message containing the time information t1 and then computes the propagation round trip time RTT0 between the master Optical Line Terminal and the master Optical Network Unit ONU0 as the difference between t2 and t1.

It is straightforward that:

$$t2-t1=t2-(t0+T_{ONU})=(t2-t0)-T_{ONU}=RTT0+T_{ONU}-T_{ONU}=RTT0$$

It should be noticed that this ranging process can be carried out regardless of the knowledge of the forward propagation delay and the return propagation delay denoted respectively in FIG. 3, $\delta 1$ and $\delta 1$, as well as processing time unknown denoted $T_{ONU}$.

The step 120 wherein each slave Optical Line Terminal, here only OLT1, discovers its associated slave Optical Network Units, here ONU1 belonging to the same sub-network 18 with all the transmission parameters relative to each slave Optical Network Units comprises a step 142 of sending by each slave OLT a discovery request message to know all transmission parameters of the respective associated ONUs and a step of ranging 144 by each slave OLT all corresponding slave Optical Network Units. Here, only ONU1 is discovered by slave Optical Line Terminal OLT1.

Figure 4:
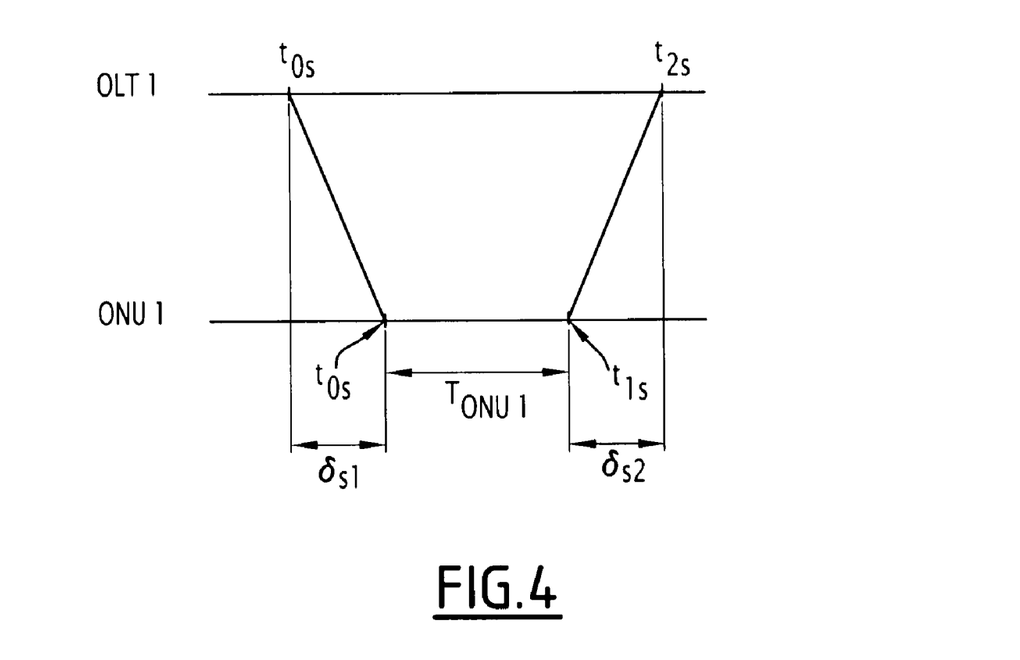
FIG. 4 is a is a view of a time-space chart representing signalling exchange between a slave Optical Line Terminal and a slave Optical Network Unit during a ranging step of the method shown in FIG. 2.

The step 144 of ranging slave Optical Network Units comprises a set of subsequent steps 146, 148, 150, 152. Displacement in time of the ranging messages exchanged between a slave Optical Line Terminal and a slave Optical Network Unit is shown in FIG. 4 for a better understanding.

In the step 146, the slave Optical Line Terminal OLT1 sends a ranging message at t0*s* in local time relative to the clock of OLT1. The ranging message sent at t0*s* contains the local time information t0*s*.

In the step 148, upon receiving by the slave Optical Network Unit ONU1 the ranging message containing t0s, the clock of the slave Optical Network Unit ONU1 is synchronized by setting the clock of ONU1 at t0s.

Then, in a step 150, the slave Optical Network Unit ONU1 sends a ranging message at the time t1s, relative to the synchronized time of the slave ONU1 clock, and containing the synchronized local time information t1s. The time t1s is the sum of t0s and a processing time unknown denoted $Ts_{ONU}$.

Then, in a step 152, upon the slave Optical Line Terminal OLT1 receives at local time t2s of the OLT1 clock the ranging message containing the time information t1s and computes the propagation round trip time RTT1 between the slave Optical Line Terminal OLT1 and the slave Optical Network Unit ONU1 as the difference between t2s et t1s.

It is straightforward that:

$$t2s-t1s=t2s-(t0s+Ts_{ONU})=(t2s-t0s)-Ts_{ONU}=RTT1+T_{ONU}-T_{ONU},$$

which leads to:

$$t2s-t1s=RTT1$$

In the FIG. 5, an illustration is provided concerning the execution times of interception step 114 and clock translation step 116 relative to the steps 100 and 112.

In the FIG. 5, an example is shown wherein the propagation delay from the master Optical Network Unit ONU0 to the slave Optical Network Unit OLT1 is less than one from the master Optical Network Unit ONU0 to the master Optical Network Unit OLT0. Since the time translation of the slave OLT executed in step 116 is an algebraic operation, the synchronization process of the slave OLT clock to the master OLT clock also well operates if the propagation delay from the master Optical Network Unit ONU0 to the slave Optical Network Unit OLT1 is more than one from the master Optical Network Unit ONU0 to the master Optical Line Terminal OLT0.

Once the clock translation executed on OLT1, the reception, in uplink at OLT1 level, of any given packet from any Optical Network Unit belonging to the sub-network 18 of OLT0 and synchronized to the OLT0 clock will be seen at the same time by OLT0 and OLT1.

Once the clock translation executed on OLT1, the reception, in uplink at OLT1 level, of any given packet transmitted from any Optical Network Unit belonging to the sub-network 18 of OLT1 and synchronized to OLT1 clock during ranging process will be also seen at the same time by OLT0 and OLT1.

Once the clock translation executed on OLT1 and also executed on any slave Optical Line Terminal different from OLT1, the reception, in uplink at OLT1 level, of any given packet transmitted from any Optical Network Unit belonging to any sub-network corresponding to a slave Optical Line Terminal different from OLT1 and synchronized to the clock of this different slave Optical Line Terminal during a ranging process will be also seen at the same time by OLT0 and OLT1, as well a the different Optical Line Terminal.

Therefore, the uplink TDMA received frame composed of packets at level of any Optical Line Terminal will be free of any colliding packets regardless of what occurs within the fibres connected between the splitter 14 and the Optical Line Terminals.

It should be noticed that round trip times computed by the master optical line Terminal OLT0 for its corresponding Optical Network Units are not correct in respect to the multiple point control unit of the slave OLT1. These round trip times computed by OLT0 and retransmitted from ONU0 can be read by OLT1 but they shall be ignored. The round trip times related to OLT0 sub-network are not useful for OLT1 which only needs to know from the master OLT0 and from the other slave Optical Line Terminals about the current status regarding transmission resources used by all Optical Network Units transmitting useful data.

Only the data related to current status of all the dynamic transmission resources allocation unit need to be known from all the Optical Line Terminals, here OLT0 and OLT1, which is effective since the dynamic transmission resources units 66 behave the same way and receive through the uplink the same data.

Thus the configuration of the slots allocated in the uplink TDMA access by each Optical Line Terminal is the same and updated in the same way.

The round trip times computed by an Optical Line Terminal for all the Optical Network Units belonging to a same associated sub-network are meaningful and necessary only for the Optical Line Terminal administrating the said sub-network.

Some scenarios of recovery of the coordinated uplink TDMA access are now described.

If some degradation of the fibre between the splitter and one Optical Line Terminal occurs, the connected Optical Line Terminal might not get the same input data as the other Optical Line Terminals. Computation for determining the uplink TDMA access will be different and collisions of packet will occur.

A mechanism is implemented wherein at each cycle the Optical Line Terminal checks whether it gets all the answers from all Optical Network Units and whether the responses are correct.

If it is not the case, the Optical Line Terminal issues empty allocation slots for it own Optical Network Units, which means that transmission resources will not be used.

If the situation becomes persistent, some other mechanism will manage the issue according the case scenario.

In a first case, the master Optical Network Unit is removed, assuming that the master Optical Line Terminal is still connected to a number of Optical Network Units belonging to a same sub-network and is working correctly. In this case, a ranging process has been carried out by the master Optical Line Terminal and a list of Optical Network Units has been built wherein the Optical Network Units are ranked in the time order of ranging success for each Optical Network Unit. The first Optical Network Unit registered in the list is determined as the master Optical Network Unit.

In the case the master Optical Network Unit is disconnected, the list is updated by removing the first registered Optical Network Unit and shifting by one the rank order of each Optical Network Unit still registered.

Then, the previous second Optical Network Unit becomes the first registered Optical Network Unit and is therefore determined as the master Optical Network Unit.

The disconnected Optical Network Unit can be again registered in the list when reconnecting at the tail of the list.

In a second case, the master Optical Line Terminal is removed from the network. As under normal operation the master Optical Line Terminal was sending regularly request messages and the master Optical Network Unit was sending regularly echo messages.

Upon removing the master Optical Line Terminal, at the same time, all the Optical Network Units of all sub-networks realize that the master Optical Line Terminal does not operate.

The first Optical Network Unit following the master Optical Network Unit in the uplink TDMA frame is known from the same database of each dynamic transmission resources unit 62.

Thus, the Optical Line Terminal corresponding to this first Optical Network Unit knows that it becomes the master Optical Line Terminal.

The new master Optical Line Terminal sends then a declaration to all Optical Network Units that it becomes the master Optical Line Terminal and a request to the first Optical Network Unit for acknowledging that it becomes the new master Optical Network Unit.

If no acknowledgement echo is sent from the new master Optical Network Unit, the process is carried out again.

In a third case all the Optical Line Terminals and associated have been powered off at the same time and these units are then powered again at the same time. The simplest configuration to study Optical Line Terminals and two Optical Network Units arranged into two sub-networks.

Upon powering on, each Optical Line Terminal listens and monitors if messages are sent.

If messages are detected, already an Optical Line Terminal is operating.

If no messages are detected, it may be required to establish a rough synchronization between the Optical Line Terminals through an auxiliary network.

Each Optical Line Terminal sends then its own ranging request and carries out a ranging process with its corresponding Optical Network Units.

In case of collision of ranging messages, a retry process is executed to solve this issue.

Once at least one Optical Line Terminal has ranged successfully an associated Optical Network Unit, the Optical Line Terminal sends a declaration message indicating that it became the master Optical Line Terminal and a request to the first Optical Network Unit successfully ranged, because it becomes the master Optical Network Unit to acknowledge this declaration.

As several Optical Network Units may be declared master by different Optical Line Terminals, the Optical Network Unit of which the echo message destined to its corresponding Optical Line Terminal is also the first message received by the other Optical Line Terminals, is declared as the master Optical Network Unit.

It should be noticed that a bottleneck exists at the level of the splitter 14 that sequences the packets issued from all the Optical Network Units in uplink. Therefore, only one Optical Network Unit will be detected as the first to have sent an echo packet if no collision occurred at the input of the splitter 14 in uplink direction.

In case of a collision at the input of the splitter, the determining process is repeated again until being successful.

The invention claimed is:

1. A method for coordinating an uplink TDMA access shared by at least two sub-networks of a Passive Optical Network, the first sub-network comprising a first Optical Line Terminal and a first set of Optical Network Units connected to the first Optical Line Terminal through a same splitter, a second sub-network comprising a second Optical Line Terminal and a second set of Optical Network Units connected to the second Optical Line Terminal through the same splitter as used by the first sub-network, each Optical Network Unit belonging to the first sub-network sharing a same first wavelength in a downlink and each Optical Network Unit belonging to the second sub-network sharing a same second wavelength in downlink, the first and second wavelengths being different, each Optical Network Unit belonging to both the first and second sub-networks sharing a same uplink wavelength different from the first and second wavelengths used in downlink direction, the first Optical Line Terminal being able to allocate transmission resources for the TDMA uplink access to be used by the corresponding Optical Network Units of the first set and able to prescribe time of transmissions in the TDMA uplink for the slots to be used by its corresponding Optical Network Units according to the allocated transmission resources and round trip propagation delays between the first Optical Line Terminal and the corresponding Optical Network Units of the first set, the second Optical Line Terminal being able to allocate transmission resources for the TDMA uplink access to be used by the corresponding Optical Network Units of the second set and able to prescribe time of transmissions in the TDMA uplink for the slots to be used by its corresponding Optical Network Units according to the allocated transmission resources and round trip propagation delays between the second Optical Line Terminal and the corresponding Optical Network Units of the second set, comprising the steps consisting of:

listening by each Optical Line Terminal all the uplink signalling data sent by all the Optical Network Units of all the sub-networks, characterized in that it comprises the following steps consisting of:

determining throughout all the sub-networks a master Optical Network Unit among all the Optical Network Units as the first listened and declared Optical Network Unit by the corresponding master Optical Line Terminal referenced as master Optical Line Terminal, at a local time t0*bis* relative to the master Optical Line Terminal, sending from the master Optical Network Unit to the other Optical Line Terminals referenced as slave Optical Line Terminals an echoed synchronization message containing synchronization information related to the corresponding master Optical Line Terminal, and in that allocation process of uplink TDMA transmission resources by each Optical Line Terminal to the respective corresponding Optical Network Units is executed in the same way on the basis of the same sequenced uplink signalling data sent by all the Optical Network Units of all the sub-networks , prescription process by each Optical Line Terminal of the time of transmissions in the TDMA uplink for the slots to be used by its corresponding Optical Network Units according to the allocated transmission resources and round trip propagation delays between the Optical Line Terminal and its corresponding Optical Network Units is a same process.

2. The method for coordinating an uplink TDMA access according to claim 1, characterized in that after the step of sending from the master Optical Network Unit to the other Optical Line Terminals an echoed packet containing synchronization information related to the corresponding master Optical Line Terminal, it comprises the following steps consisting of, for each slave Optical Line Terminal:

intercepting at a respective interception local time t3 provided by the clock of the slave Optical Line Terminal the echoed synchronization message containing the synchronization information related to the corresponding master, and translating the current respective interception local time t3 by the time difference between a synchronization time derived from the synchronization information and the current local time t3 to obtain a new local time respective to slave Optical Line Terminal, so that every message intercepted in uplink in a given time of the new translated local time is also seen at the same time by the clock of the master Optical Line Terminal.

3. The method for coordinating an uplink TDMA access according to any of claims 1 and 2, characterized in that it comprises a step consisting of ranging the master Optical Network Unit relative to the master Optical Line Terminal by computing at the master Optical Line Terminal level a propagation round trip time between the master Optical Line Terminal and the master Optical Network Unit, the ranging of the master Optical Network Unit being executed before the step of sending the synchronization information, and synchronization information related to the corresponding master Optical Line Terminal contains the local time information t0*bis* relative to the master Optical Line Terminal of sending a ranging packet and the computed ranging data.

4. The method for coordinating an uplink TDMA access according to claim 3, characterized in that the synchronization time is the sum of the local time information t0*bis* relative to the master Optical Line Terminal of sending a ranging packet and the computed ranging data.

5. The method according to for coordinating an uplink TDMA access according to claim 2, characterized in that the step of ranging the master Optical Network Unit relative to the master optical line Terminal comprises the steps consisting of sending from the master Optical Line Terminal an echo ranging message at t0, local time relative the master OLT, containing the local time information t0, upon receiving by the master Optical Network Unit the ranging message containing t0, synchronizing the clock of master Optical Network Unit at a synchronized time by setting the said clock at t0, sending from the master Optical Network Unit a ranging message at t1, referenced to the synchronized time of the master Optical Network Unit clock, and containing the synchronized local time information t1, upon receiving by the master Optical Line Terminal at local time t2 relative to master Optical Line Terminal the ranging message containing the time information t1, computing the propagation round trip time between the master Optical Line Terminal and the master Optical Network Unit as the difference between t2 and t1.

6. The method according to claim 2, characterized in that in the step during the step of sending an echoed message from the master Optical Network Unit, the echoed synchronization message further contains information related to the Optical Network Units associated to and ranged by the master Optical Line Terminal, and in that it comprises the following step consisting of:

duplicating by the slave Optical Line Terminals the current transmission resource values from Optical Network Units associated to master OLT.

7. The method according to claim 2, characterized in that it comprises the step consisting of after translating the clocks of all the slave Optical Line Terminals, for each slave Optical Line Terminal, discovering the respective associated slave Optical Network Units relative to the corresponding slave Optical Line Terminal with all the transmission parameters relative to each slave Optical Network Unit.

8. The method according to claim 7, characterized in that the discovery step of the slave Optical Network Units associated to the corresponding slave Optical Line Terminal comprises the following steps consisting of:

sending by the slave Optical Line Terminal a discovery request message at the same time as the master Optical Line Terminal to all associated slave Optical Network Units, containing an identifier of the slave Optical Line Terminal, ranging each slave Optical Network Unit relative to the slave Optical Line Terminal by subsequently:

sending from the slave Optical Line Terminal a ranging message at ts0, local time relative the master OLT, containing the local time information ts0, upon receiving by the slave Optical Network Unit the ranging message containing ts0, synchronizing the clock of slave Optical Network Unit at a synchronized time by setting the said clock at ts0, sending from the slave Optical Network Unit a ranging message at ts1, referenced to the synchronized time of the slave Optical Network Unit clock, and containing the synchronized local time information ts1 as well as the identifier of the slave Optical Line Terminal, upon receiving by the corresponding slave Optical Line Terminal at local time ts2 relative to master Optical Line Terminal the ranging message containing the time information ts1, computing the propagation round trip time between the slave Optical Line Terminal and the slave Optical Network Unit as the difference between ts2 and ts1.

9. A passive optical network comprising at least two sub-networks, a first sub-network comprising a first Optical Line Terminal and a first set of Optical Network Units connected to the first Optical Line Terminal through a same splitter, a second sub-network comprising a second Optical Line Terminal and a second set of Optical Network Units connected to the second Optical Line Terminal through the same splitter as used by the first sub-network, each Optical Network Unit belonging to the first sub-network sharing a same first wavelength in a downlink and each Optical Network Unit belonging to the second sub-network sharing a same second wavelength in downlink, the first and second wavelengths being different, each Optical Network Unit belonging to both the first and second sub-networks sharing a same uplink wavelength different from the first and second wavelengths and used in the downlink, the first Optical Line Terminal having a first dynamic transmission resources allocation unit being able to allocate transmission resources for the TDMA uplink access to be used by the corresponding Optical Network Units of the first set and a multiple point control unit able to prescribe time of transmissions in the TDMA uplink for the slots to be used by its corresponding Optical Network Units according to the allocated transmission resources and computed round trip propagation delays between the first Optical Line Terminal and the corresponding Optical Network Units of the first set, the second Optical Line Terminal having a second dynamic transmission resources allocation unit being able to allocate transmission resources for the TDMA uplink access to be used by the corresponding Optical Network Units of the second set and a multiple point control unit able to prescribe time of transmissions in the TDMA uplink for the slots to be used by its corresponding Optical Network Units according to the allocated transmission resources and computed round trip propagation delays between the second Optical Line Terminal and the corresponding Optical Network Units of the second set, characterized in that each Optical Line Terminal comprises Optical Line Terminal means for coordinating an uplink TDMA access firstly as a master Optical Line Terminal able to determine throughout all the sub-networks a master Optical Network Unit among all the Optical Network Units as the first listened and declared ONU by the corresponding master Optical Line Terminal referenced as master Optical Line Terminal, each Optical Network Unit comprises Optical Network Unit means for coordinating uplink TDMA access, firstly as a master Optical Network Unit able at a local time t0*bis* relative to the master Optical Line Terminal, sending to the other Optical Line Terminals referenced as slave Optical Line Terminals an echoed synchronization message containing synchronization information related to the corresponding master Optical Line Terminal, all the dynamic transmission resources allocation units are able to carry out a same allocation process, all the multiple point control units are able to carry out the same prescription process of the time of transmissions.

10. The passive optical network according to claim 1, characterized in that each Optical Line Terminal means for coordinating an uplink TDMA access, secondly, operating as for a slave Optical Line Terminal, are able after receiving from the master Optical Network Unit an echoed packet containing synchronization information related to the corresponding master Optical Line Terminal, to intercept at a respective interception local time ts3 provided by the clock of the slave Optical Line Terminal, the echoed synchronization message containing the synchronization information related to the corresponding master Optical Line Terminal, and to translate the current respective interception local time ts3 by the time difference between a synchronization time derived from the synchronization information and the current local time t3 to obtain a new local time respective to slave Optical Line Terminal, so that every message intercepted in uplink in a given time of the new translated local time is also seen at the same time by the clock of the master Optical Line Terminal.

* * * * *